US009448801B2

United States Patent
Sun (10) Patent No.: US 9,448,801 B2
(45) Date of Patent: Sep. 20, 2016

(54) AUTOMATIC REGISTER PORT SELECTION IN EXTENSIBLE PROCESSOR ARCHITECTURE

(71) Applicant: Cadence Design Systems, Inc., San Jose, CA (US)

(72) Inventor: Fei Sun, Santa Clara, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 728 days.

(21) Appl. No.: 13/732,183

(22) Filed: Dec. 31, 2012

(65) Prior Publication Data

US 2014/0189318 A1    Jul. 3, 2014

(51) Int. Cl.
*G06F 9/44* (2006.01)
*G06F 9/00* (2006.01)
*G06F 9/30* (2006.01)

(52) U.S. Cl.
CPC .................................. *G06F 9/30141* (2013.01)

(58) Field of Classification Search
None
See application file for complete search history.

(56) References Cited

U.S. PATENT DOCUMENTS

| 4,053,871 | A |  | 10/1977 | Vidalin et al. |
| 5,696,959 | A | * | 12/1997 | Guttag et al. .................. 712/245 |
| 5,805,906 | A | * | 9/1998 | Cheong et al. ................ 710/260 |
| 5,809,327 | A | * | 9/1998 | Wollan ................ G06F 15/7814 |
|  |  |  |  | 712/33 |
| 6,216,200 | B1 | * | 4/2001 | Yeager .................. G06F 9/3834 |
|  |  |  |  | 711/100 |
| 6,272,257 | B1 |  | 8/2001 | Prokop |
| 6,349,379 | B2 |  | 2/2002 | Gibson et al. |
| 6,385,757 | B1 | * | 5/2002 | Gupta .................. G06F 17/5045 |
|  |  |  |  | 716/102 |
| 6,408,380 | B1 | * | 6/2002 | Huck .................. G06F 9/30043 |
|  |  |  |  | 711/149 |
| 6,408,428 | B1 | * | 6/2002 | Schlansker et al. .......... 716/104 |
| 6,507,947 | B1 | * | 1/2003 | Schreiber et al. ............. 717/160 |
| 6,539,467 | B1 |  | 3/2003 | Anderson et al. |
| 8,441,284 | B1 |  | 5/2013 | Han et al. |
| 2002/0087846 | A1 | * | 7/2002 | Nickolls ............... G06F 9/3001 |
|  |  |  |  | 712/229 |
| 2006/0095743 | A1 | * | 5/2006 | Srinivasan .......... G06F 9/30032 |
|  |  |  |  | 712/228 |
| 2009/0063820 | A1 |  | 3/2009 | Xi et al. |
| 2009/0144583 | A1 |  | 6/2009 | Bruennert et al. |

* cited by examiner

*Primary Examiner* — Michael Sun
(74) *Attorney, Agent, or Firm* — Schwegman Lundberg & Woessner, P.A.

(57) ABSTRACT

This document discusses, among other things, systems and methods to access n consecutive entries of a register file in a single operation using a register file entry index consisting of B bits, wherein B is less than the binary logarithm of a depth of the register file, which corresponds to the number of entries in the register file, and to automatically select, for a set of register arguments for the n consecutive entries, between a register port for each argument requiring a register port or one or more shared register ports for the set of register arguments according to description of an instruction set architecture associated with the register file.

19 Claims, 7 Drawing Sheets

AUTOMATIC REGISTER PORT SELECTION IN EXTENSIBLE PROCESSOR ARCHITECTURE

BACKGROUND

Processors have traditionally been difficult to design and to modify. For this reason, most systems that contain processors use ones that were designed and verified once for general-purpose use, and then used by multiple applications over time. As such, their suitability for a particular application is not always ideal. It would often be appropriate to modify the processor to execute a particular application's code better (e.g., to run faster, consume less power, or cost less). However, the difficulty, and therefore the time, cost, and risk of modifying an existing processor design is high, and this is not typically done.

Another difficulty with prior art processor design stems from the fact that it is not appropriate to simply design traditional processors with more features to cover all applications, because any given application only requires a particular set of features, and a processor with features not required by the application is overly costly, consumes more power and is more difficult to fabricate. In addition it is not possible to know all of the application targets when a processor is initially designed. If the processor modification process could be automated and made reliable, then the ability of a system designer to create application solutions would be significantly enhanced.

Configurable processors having easily modified or extended instruction sets and architectures to enhance or customize functionality of the processor can be used to accommodate specific application requirements. Configurability allows the designer to specify whether or how much additional functionality is required for a product. The simplest sort of configurability is a binary choice: either a feature is present or absent. For example, a processor might be offered either with or without floating-point hardware.

Though, once the processor has been designed, its operation must be verified. Processors generally execute instructions from a stored program using a pipeline with each stage suited to one phase of the instruction execution. Therefore, changing or adding an instruction or changing the configuration may require widespread changes in the processor's logic so each of the multiple pipeline stages can perform the appropriate action on each such instruction. Configuration of a processor requires that it be re-verified, and that this verification adapt to the changes and additions. This is not a simple task. Processors are complex logic devices with extensive internal data and control state, and the combinations of control and data and program make processor verification a demanding art. Adding to the difficulty of processor verification is the difficulty in developing appropriate verification tools. Since verification is not automated in prior art techniques, its flexibility, speed and reliability is less than optimal.

In addition, once the processor is designed and verified it is not particularly useful if it cannot be programmed easily. Processors are generally programmed with the aid of extensive software tools, including compilers, assemblers, linkers, debuggers, simulators and profilers. However, when the processor changes, the software tools used to program the processors must change as well. It does no good to add an instruction if that instruction cannot be compiled, assembled, simulated or debugged. The cost of software changes associated with processor modifications and enhancements has been a major impediment to flexible processor design in the prior art.

Thus, it is seen that prior art processor design is of a level of difficulty that processors generally are not typically designed or modified for a specific application. Also, it can be seen that considerable improvements in system efficiency are possible if processors could be configured or extended for specific applications. Further, the efficiency and effectiveness of the design process could be enhanced if it were able to use feedback on implementation characteristics, such as power consumption, speed, etc., in refining a processor design. Moreover, in the prior art once a processor is modified, a great deal of effort is required to verify the correct operation of the processor after modification. Finally, although prior art techniques provide for limited processor configurability, they fail to provide for the generation of software development tools tailored for use with the configured processor.

OVERVIEW

This document discusses, among other things, systems and methods to access n consecutive entries of a register file in a single operation using a register file entry index consisting of B bits, wherein B is less than the binary logarithm of a depth of the register file, which corresponds to the number of entries in the register file, and to automatically select, for a set of register arguments for the n consecutive entries, between a register port for each argument requiring a register port or one or more shared register ports for the set of register arguments according to description of an instruction set architecture associated with the register file.

In various examples, B can include the binary logarithm of the quotient of the depth of the register file divided by n, or B can include the binary logarithm of the quotient of d divided by n, where d is the smallest power-of-two number that is greater than or equal to the depth of the register file. In certain examples, n can be restricted to a power-of-two number.

Further, in addition to accessing n consecutive entries of the register file in the single operation using the register file entry index consisting of B bits, the systems and methods disclosed herein can receive an instruction to selectively update a value of one or more selected bits of one of the n consecutive entries of the register file, receive the one or more selected bits of the register file entry to be updated and one or more selected bits of the first register to remain unchanged, and selectively update the value of the one or more selected bits of the n consecutive entries of the register file, using a first write port, without receiving the value of the one or more selected bits of the first register. In certain examples, the instruction to selectively update the value of the one or more selected bits of one of the n consecutive entries of the register file can define the one or more selected bits of the first register to be updated, for example, using a bit level kill signal.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present inventor has recognized, among other things, systems and methods to update register files of extensible processors in any bit groups in a formal language. The system can include a processor generation module configured to automatically generate a register file and instructions to update the register file based on a formal language description. Further, the system can include a software tool generation module configured to automatically generate one or more software tools (e.g., a compiler, a simulator, etc.) from the formal language. In various examples, one or more of the methods described herein can be implemented by a processor or a machine.

In certain examples, the systems and methods disclosed herein build upon one or more aspects of the technology described in the commonly assigned Killian et al. U.S. Pat. No. 6,477,683, titled "AUTOMATED PROCESSOR GENERATION SYSTEM FOR DESIGNING A CONFIGURABLE PROCESSOR AND METHOD FOR THE SAME," (herein, "Killian et al. '683") filed on Feb. 5, 1999, Killian et al. U.S. Pat. No. 6,477,697, titled "ADDING COMPLEX INSTRUCTION EXTENSIONS DEFINED IN A STANDARDIZED LANGUAGE TO A MICROPROCESSOR DESIGN TO PRODUCE A CONFIGURABLE DEFINITION OF A TARGET INSTRUCTION SET, AND HDL DESCRIPTION OF CIRCUITRY NECESSARY TO IMPLEMENT THE INSTRUCTION SET, AND DEVELOPMENT AND VERIFICATION TOOLS FOR THE INSTRUCTION SET," (herein, "Killian et al. '697") filed on May 28, 1999, and Wang et al. U.S. Pat. No. 7,346,881, titled "METHOD AND APPARATUS FOR ADDING ADVANCED INSTRUCTIONS IN AN EXTENSIBLE PROCESSOR ARCHITECTURE," (herein, "Wang et al. '881") filed on May 13, 2002, the disclosures of each of which are incorporated herein in their entirety, including their descriptions of the Tensilica Instruction Set Extension (TIE) language, compiler, and other tools, and methods and apparatus for adding advanced instructions in an extensible processor architecture.

The systems and methods disclosed herein can extend the TIE language with new constructs and augmented software tools, such as compilers and the like, that support these constructs. Accordingly, the systems and methods disclosed here, in combination with the disclosures of the Killian et al. and Wang et al. patents referenced above, can enable those skilled in the art to practice a method for generating both hardware implementations and software tools for the extended processors.

In existing processor art, a register file is a set of N storage locations, each having B bits. Existing operation operands (operation arguments) update one or more storage locations as a unit, all bits at once. One storage location is generally referred to as a register file entry. An example move operation is illustrated in Ex. 1, below:

```
regfile XR 16 16 xr                                           Ex. 1
operation XRMOVE {out XR xrr, in XR xrs, in XR xrt} { } {
   assign xrr = xrs;
   assign xrr_kill = xrt[0];
}
```

In Ex. 1, a register file XR contains 16 entries, each entry 16-bits wide. Three operation arguments are defined on the XR register file: xrr, xrs, and xrt. Operation XRMOVE updates the value in the register specified by the operation argument xrr (the xrr register) with the value in the register specified by the operation argument xrs (the xrs register). The update can be performed when the one-bit signal xrr_kill receives a first value (e.g., zero). If xrr_kill receives a second value (e.g., one), the write to the xrr register can be killed and the xrr register can retain its original value. In an example, the value of xrr_kill can be assigned from the least significant bit of the xrt register. In other examples, the value of xrr_kill can be assigned from an arbitrary expression composed of one or multiple input operands of the operation as well as constants. In this example, the value of the xrr register can be updated to be the value of the xrs register only when the least significant bit of xrt register is zero.

If, however, in the case that the xrr register is updated, the intended functionality of the operation is to update the lower eight bits of the xrr register with the lower eight bits of the xrs register, while the upper eight bits of the xrr register retains its original value, in existing processor art, the operation needs to read in the original value of the xrr register and compose the new value of the xrr register within the operation, as illustrated in an XRPMOVE operation in Ex. 2, below:

```
operation {XRPMOVE} {inout XR xrr, in XR xrs, in XR xrt} { }   Ex. 2
{
   assign xrr = {xrr[15:8], xrs[7:0]};
   assign xrr_kill = xrt[0];
}
```

In Ex. 2, reading in the original value of the xrr register using a read port is necessary because the update to the register file entry is performed as a unit, and not as individual bits. In existing processor art, the XRMOVE operation uses two input arguments (xrs and xrt) and one output argument (xrr), while the XRPMOVE operation requires one extra input argument (xrr).

If XRMOVE is the only operation added to an extensible processor, two read ports and one write port are created for the XR register file, one for each input and output argument. However, if XRPMOVE is the only operation added to an extensible processor, three read ports and one write port are created for the XR register file. This extra read port can be expensive in terms of hardware cost because of the extra read pipeline, bypass logic, or interlock logic generated.

If multiple operations are added to the processor that access the XR register file, the number of read ports and write ports of the XR register file may not change after adding the XRMOVE or XRPMOVE operation. However, the fixed number of read and write ports of the XR register file limits the number of operations that can be executed in parallel. For example, suppose the design needs to create at most six read and three write ports for the XR register file due to the hardware cost of the ports. Three XRMOVE operations can be executed in parallel because each operation accesses two read and one write ports. However, two XRPMOVE operations can be executed in parallel because each operation accesses three read and one write ports. Thus, the throughput of XRPMOVE operation is two-thirds of the XRMOVE operation.

Due to the limitations of partially updating a register file entry in the existing processor art, the systems and methods disclosed herein enhance the existing TIE language to allow a register file entry to be updated partially without requiring the value of the register file to be read, and thus, without requiring an extra read port. For each output operation argument, also referred to as operand (<opnd>) of an operation, users can assign a bit level kill of an argument (<opnd>_bitkill) to specify the one or more selected bits of a first register to be updated and one or more selected bits of the first register to retain their original value, or in certain examples, remain unchanged. With this new TIE construct, the functionality of the XRPMOVE operation can be illustrated in Ex. 3, below:

```
operation {XRPKMOVE} {out XR xrr, in XR xrs, in XR xrt} { }   Ex. 3
{
  assign xrr = xrs;
  assign xrr_bitkill = {8'hFF, 8'h0};
  assign xrr_kill = xrt[0];
}
```

In Ex. 3, signal xrr_bitkill is 16-bits wide. In this example, the lower eight bits are all a first value (e.g., zero), indicating that the lower eight bits of xrr always get the lower eight bits of xrs. Further, in this example, the upper eight bits of xrr_bitkill are all a second value (e.g., one), indicating that the upper eight bits of xrr always remain unchanged or retain the original value. Because the one-bit signal xrr_kill is also specified in the operation, the value of xrr_bitkill only takes effect when the xrr_kill receives a first value (e.g., zero). Otherwise the entire write to the xrr operand is killed.

The functionality of the xrr_kill of operation XRPK-MOVE in Ex. 3 can be implemented using xrr_bitkill, as illustrated in Ex. 4, below:

```
operation {XRPKMOVEP} {out XR xrr, in XR xrs, in XR xrt} { } Ex. 4
{
  assign xrr = xrs;
  assign xrr_bitkill = {8'hFF, {8{xrt[0]}}};
}
```

In Ex. 4, the lower eight bits are assigned to the least significant bit of the operand xrt, indicating that the lower eight bits of xrr get the lower eight bits of xrs when the least significant bit of xrt is zero. The upper eight bits of xrr_bitkill are all a second value (e.g., one), indicating that the upper eight bits of xrr always remain unchanged or retain the original value. As illustrated in Ex. 4, the one-bit <opnd>_kill signal can be implemented using the <opnd>_bitkill signal using comparable hardware.

Whereas the operation XRPMOVE requires three input arguments and one output argument, the operations XRPK-MOVE and XRPKMOVEP, described above, require two input arguments and one output, one less input argument than XRPMOVE while maintaining the same throughput as XRPMOVE.

In other examples, operations other than the MOVE operations can utilize <opnd>_bitkill. For example, <opnd>_bitkill can be used to update the selected bits of a register a, during a MYADD operation, as illustrated in Ex. 5, below:

```
operation MYADD {out XR a, in XR b, in XR c, in BR2 sel} { }  Ex. 5
{
  wire [7:0] a_hi = b[15:8] + c[15:8];
  wire [7:0] a_lo = b[7:0] + c[7:0];
  assign a = {a_hi, a_lo};
  assign a_bitkill = {{8{sel[1]}}, {8{sel[0]}}};
}
```

Here, the upper and lower bits of registers b and c are separately added and <opnd>_bitkill is used to define which bits of the register a to be updated according to the first and second bits of sel.

In other examples, the value assigned to the <opnd>_bitkill can be an arbitrary expression not defined in the instruction or in an input operand on the same register file, for example, using a state register (state st), as illustrated in Ex. 6, below:

```
  state st 16 add_read_write                                  Ex. 6
  regfile XR 16 16 xr
  operation StateKill {out XR a, in XR b, in XR c} {in st} {
    wire [7:0] a_lo = b[7:0] + c[7:0];
    wire [7:0] a_hi = b[15:8] + c[15:8];
    assign a = {a_hi, a_lo};
    assign a_bitkill = {{8{st[8]}}, {8{st[0]}}};
  }
```

Here, the lower and upper halves of a are updated based on the 8th bit and zero bit of the state st.

In another example, the value assigned to the <opnd>_bitkill can be defined using an immediate operand, as illustrated in Ex. 7, below:

```
immediate_range imm 0 3 1                                     Ex. 7
operation ImmedKill {out XR a, in XR b, in XR c, imm
immed} { } {
  wire [7:0] a_lo = b[7:0] + c[7:0];
  wire [7:0] a_hi = b[15:8] + c[15:8];
  assign a = {a_hi, a_lo};
  assign a_bitkill = {{8{immed[1]}}, {8{immed[0]}}};
}
```

In another example, if the addition of two halves of data result to an overflow, the assignment to the corresponding half can be killed, as illustrated in Ex. 8, below.

```
operation OverflowKill {out XR a, in XR b, in XR c} { } {    Ex. 8
    wire [8:0] a_lo = {1'b0, b[7:0]} + {1'b0, c[7:0]};
    wire [8:0] a_hi = {1'b0, b[15:8]} + {1'b0, c[15:8]};
    assign a = {a_hi[7:0], a_lo[7:0]};
    assign a_bitkill = {{8{a_hi[8]}}, {8{a_lo[8]}}};
}
```

To generalize the usage of the <opnd>_bitkill signal, the following rules can apply:
- If <opnd>_kill is assigned to value 1'b1, the write to <opnd> can be killed and the value of <opnd>_bitkill can be ignored.
- The value of the bit index <i> of <opnd> can be updated to the new value when the value of the bit index <i> of <opnd>_bitkill is a first value (e.g., zero), and can retain its original value when the value of the bit index <i> of <opnd>_bitkill is a second value (e.g., one).
- <opnd>_bitkill has the same width as <opnd>, which is referred to as <ow>.
  - <ow> can have the same register file width <rw> for operation arguments accessing a single register entry. If the argument <opnd> specifies a group of several adjacent registers, the <ow> is the register file entry width <rw> times the number of adjacent registers being grouped together.
- The <opnd> is divided into <n> equal sized data elements, each data element is data width <dw> bit wide. Thus, <ow>=<n>*<dw>. The data in one data element can be either updated or preserve the original value as a unit. However, in an example, the data within a data element cannot be partially updated. This can be achieved by assigning the same one-bit value to all bits of the same element in the <opnd>_bitkill signal.
- The <opnd>_bitkill can also be divided into <n> equal sized data elements, each data element is data width <dw> bit wide. The bits within a data element can be one of the following. All other assignment can result in an error from a TIE compiler.
  - All bits are constant ones. The corresponding data element in <opnd> retains its original value.
  - All bits are constant zeros. The corresponding data element in <opnd> gets the updated value.
  - The data element value is assigned from a one-bit wire replicated <dw> times. The corresponding data element in <opnd> is updated if the one-bit wire is evaluated to be a first value (e.g., zero) at runtime. Otherwise, the corresponding data element in <opnd> retains its original value.
- If an operation does not explicitly assign any value to <opnd>_bitkill, the default value can be a first value (e.g., zero), and the data width <dw> can equal the operand width <ow>.
- In a semantic, an <opnd> can be updated by multiple operations. The assignment to <opnd>_bitkill can be a complex expression composed of the expressions for each operation. In certain examples, those expressions need to follow the above rules individually, as illustrated in Ex. 9, below:

```
assign xrr_bitkill = TIEsel(OP1, {8'hFF, 8'h0},            Ex. 9
                            OP2, {4'hF, 4'h0, 4'hF, 4'h0},
                            OP3, {{8{kill_hi}}, {8{kill_lo}}});
```

In Ex. 9, the semantic contains three operations OP1, OP2, and OP3 that write to the operand xrr. The TIEsel module selects one of the three expressions to be assigned to xrr_bitkill based on the opcode. Each expression follows the above rules. The data width (<dw>) of the operation argument xrr in the semantic is calculated to be the greatest common divisor of the data width of all the expressions. In Ex. 9, the data width of xrr_kill is four.

The data width <dw> of a register file can be calculated to be the greatest common divisor of the data width <dw> of all output operation arguments of the register file and the register file width <rw>.

The data width <dw> of the register file can be calculated by the TIE compiler. One bit in each <dw> bits of the <opnd>_bitkill signal can be ORed with the <opnd>_kill signal and obtain the kill signal for this data element. The remaining bits are not connected. The qualifying signals (e.g., semantic use and operand def signals) can qualify each data element separately. The register file write port enable signal can be <rw>/<dw> bits wide, which is the negation of the concatenation of the kill signal of all data elements.

The decision to calculate the data width <dw> by the TIE compiler implicitly is to allow flexible instruction set architecture (ISA) design. If an extensible processor does not need to update a register file entry partially, the processor can be designed without considering this feature. If further development on the extensible processor requires updating the register file partially, the new operations added to the processor can take advantage of this feature, but all existing operations and register files do not need any modification. This extensibility cannot be achieved if the data with <dw> is specified in the TIE language.

The hardware cost of dividing a register file entry into multiple slices is small. However, the hardware cost increases as the number of slices increase. The rules that are applied to the <opnd>_bitkill ensures that the TIE compiler computes the minimum number of slices (maximum number of bits in a data element) necessary to reduce the hardware cost overhead while preserving the functionality.

Figure 1:
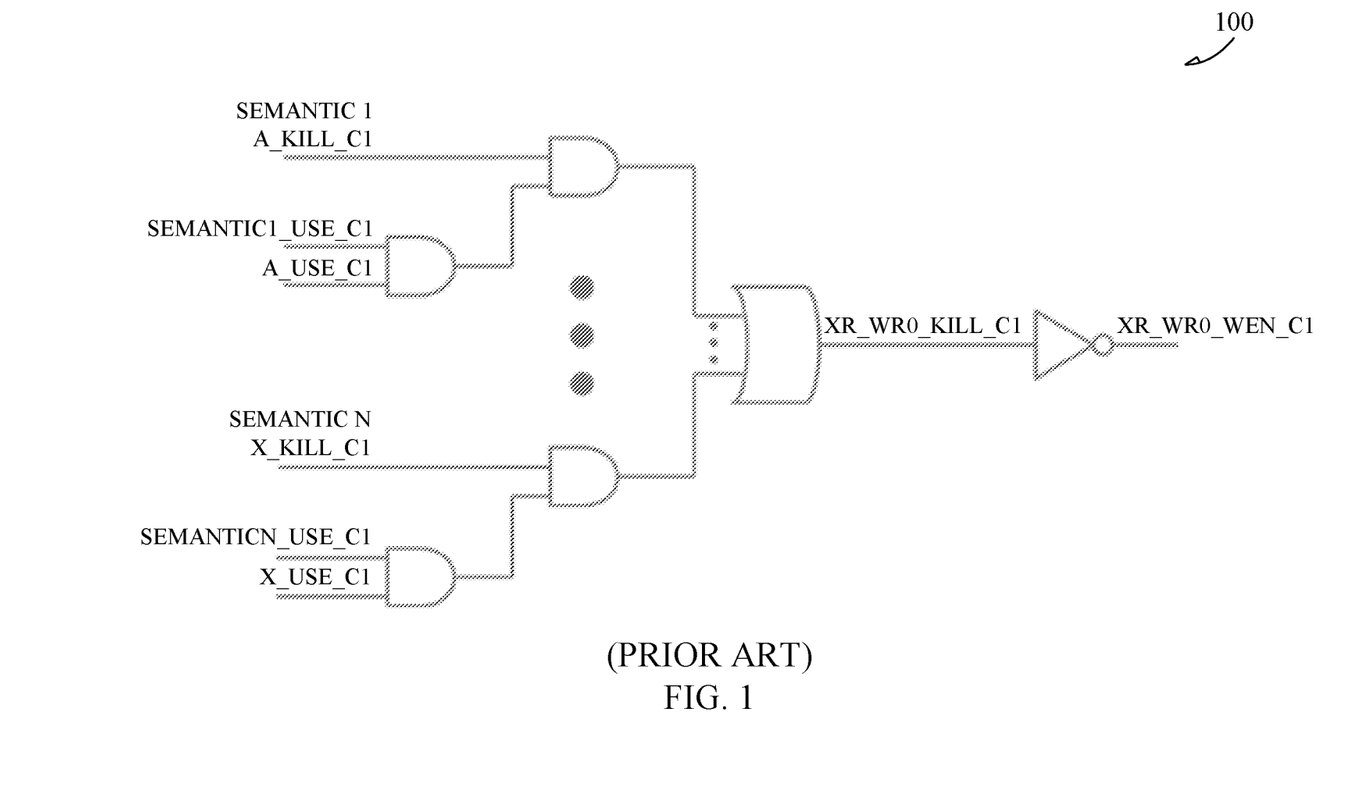
FIG. 1 illustrates generally example logic to generate a single-bit write enable signal of a register file.

FIG. 1 illustrates generally example logic 100 configured to generate a single-bit write enable signal (XR_wr0_wen_C1) of a register file without partial-update capabilities, for example, to be used with instructions such as illustrated in Ex. 1, above.

Figure 2:
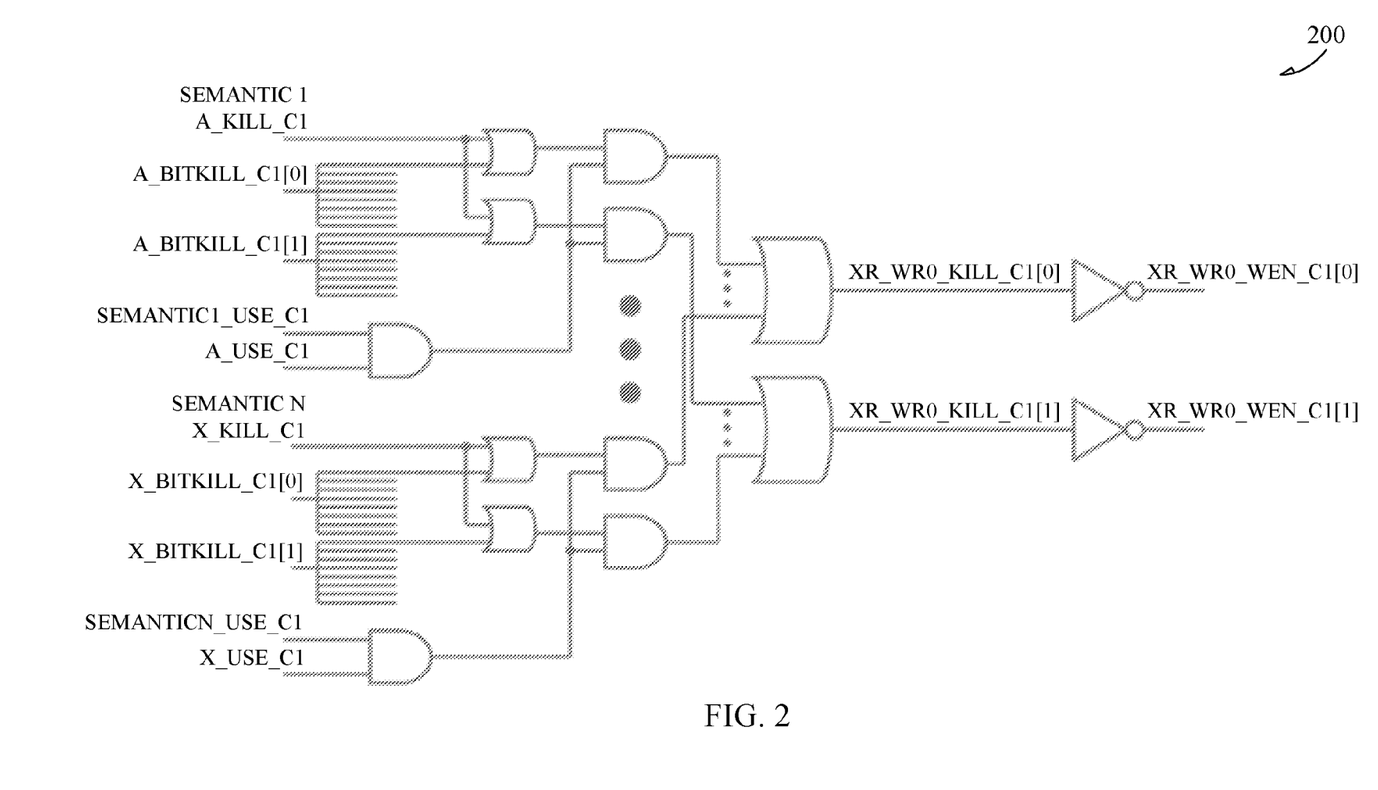
FIG. 2 illustrates generally example logic to generate a two-bit write enable signal on an X-bit wide register file where the lower and upper X/2 bits, multiple slices, can be updated independently.

FIG. 2 illustrates generally example logic 200 configured to generate a two-bit write enable signal (XR_wr0_wen_C1[0], XR_wr0_wen_C1[1]) on an X-bit (e.g., 16-bit, etc.) wide register file where the lower and upper X/2 bits (e.g., 8 bits, etc.), multiple slices, can be updated independently. Accordingly, FIG. 2 illustrates an example data path with partial-update capabilities, for example, to be used with instructions such as illustrated in Ex. 3, above. In other examples, the bits of the register file can be divided differently than the upper and lower bits shown in Ex. 3.

Based on the calculated <dw>, the processor generation module can divide the data path portion of the register file (e.g., the register file entry and the corresponding bypass logic) into <rw>/<dw> slices. Each slice can be enabled and bypassed independently and controlled by the corresponding bit in the register file write port enable signal.

Figure 3:
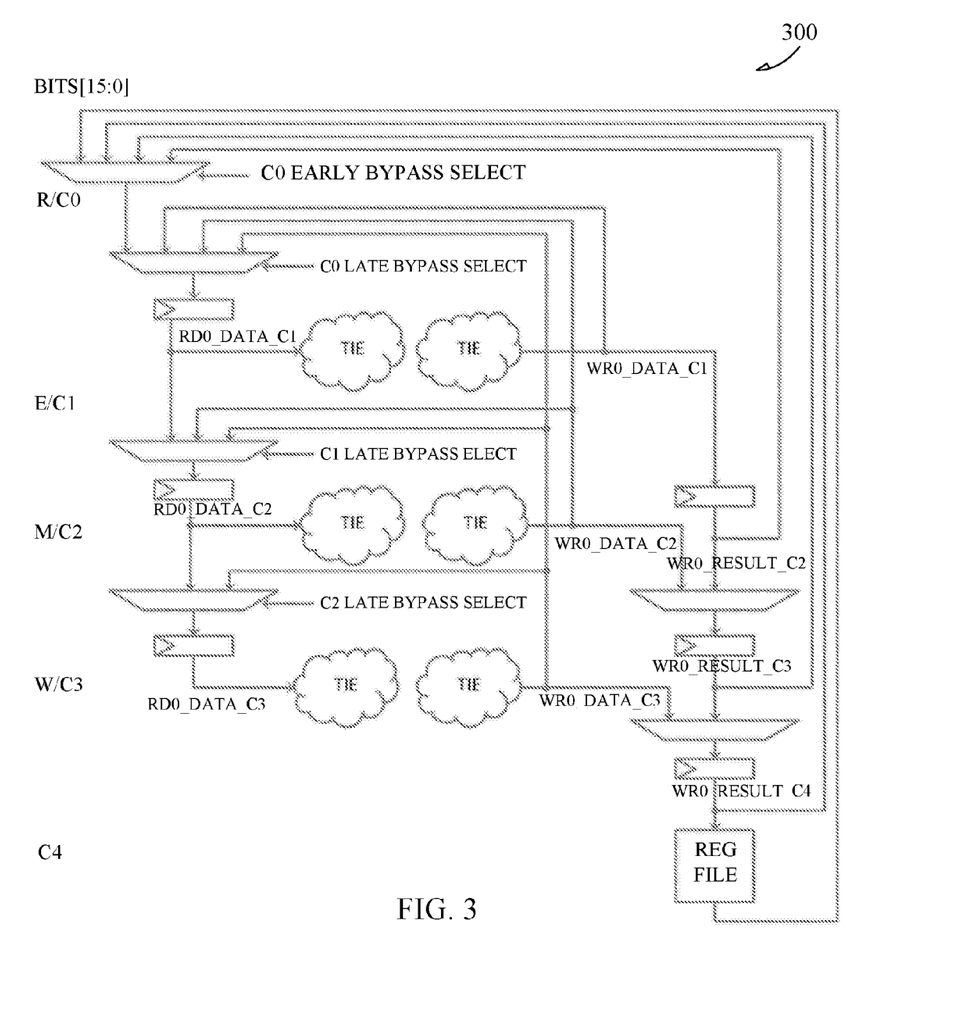
FIG. 3 illustrates generally example logic and single-slice data path for an example 16-bit wide register file with one read port and one write port without partial-update capabilities.

FIG. 3 illustrates generally example logic 300 and single-slice data path for an example 16-bit wide register file with one read port and one write port without partial-update capabilities, for example, to be used with instructions such as illustrated in Ex. 1, above. In this example, each wire in FIG. 3 is 16-bits wide (e.g., [15:0], excluding MUX select signals), and the data width <dw> of the register file equals the width <rw> of the register file of 16 bits. The read port is used in stages 1, 2, and 3, signified by each of three sets of TIE modules, to read values of the register file (regfile) into each TIE module. The write port is defined in stages 1, 2, and 3, again, signified by each of the three sets of TIE modules, to write values from the TIE modules back into the register file (regfile).

Figure 4:
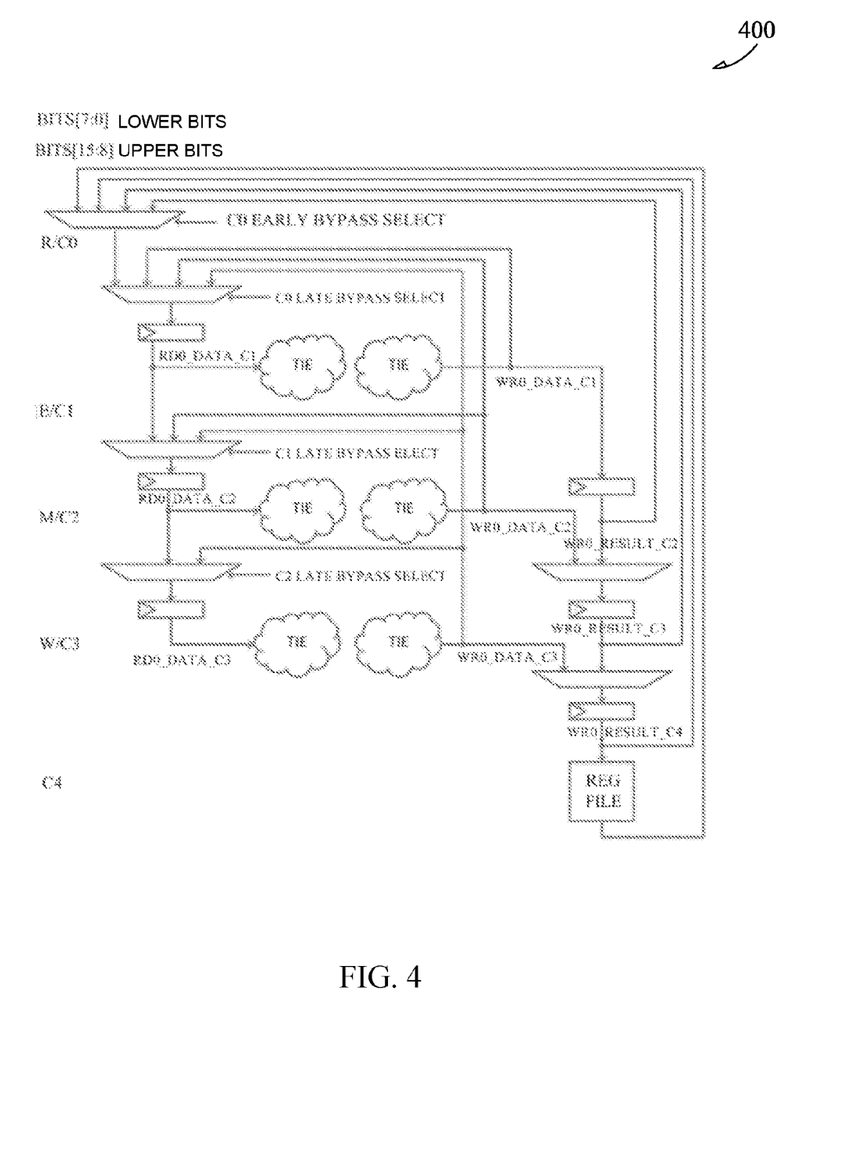
FIG. 4 illustrates generally example logic and multi-slice data path for an example 16-bit wide register file with one read port and one write port with partial-update capabilities.

FIG. 4 illustrates generally example logic 400 and multi-slice data path for an example 16-bit wide register file with one read port and one write port with partial-update capabilities, for example, to be used with instructions such as illustrated in Ex. 3, above. In this example, the data width <dw> of the register file is 8 bits, one-half of the register file width <rw> of 16 bits, though in other examples, other data and register file widths can be used. The data path of the register file can be sliced into multiple slices, in this example, two slices, top and bottom. Here, the top slice contains the upper bits [15:8] of the register file and the bottom slice contains the lower bits [7:0] of the register file. If divided equally, the logic structures of the slices can be identical or nearly identical, and in certain examples, equivalent to the logic structure illustrated in FIG. 3.

Even though the register file in the example of FIG. 4 contains two slices, while the register file in the example of FIG. 3 contains one slice, each slice in FIG. 4 is roughly half the size of the single slice in FIG. 3. Thus, the data path portion of the register file in the example of FIG. 4 is about the same as the data path portion of the register file in the example of FIG. 3. In other examples, as the number of slices increase, the size of each slice can decrease roughly proportionately to the increase in the number of slices, keeping the data path portion of the multiple slice register file about the same as the single-slice data path illustrated in FIG. 3.

Figure 5:
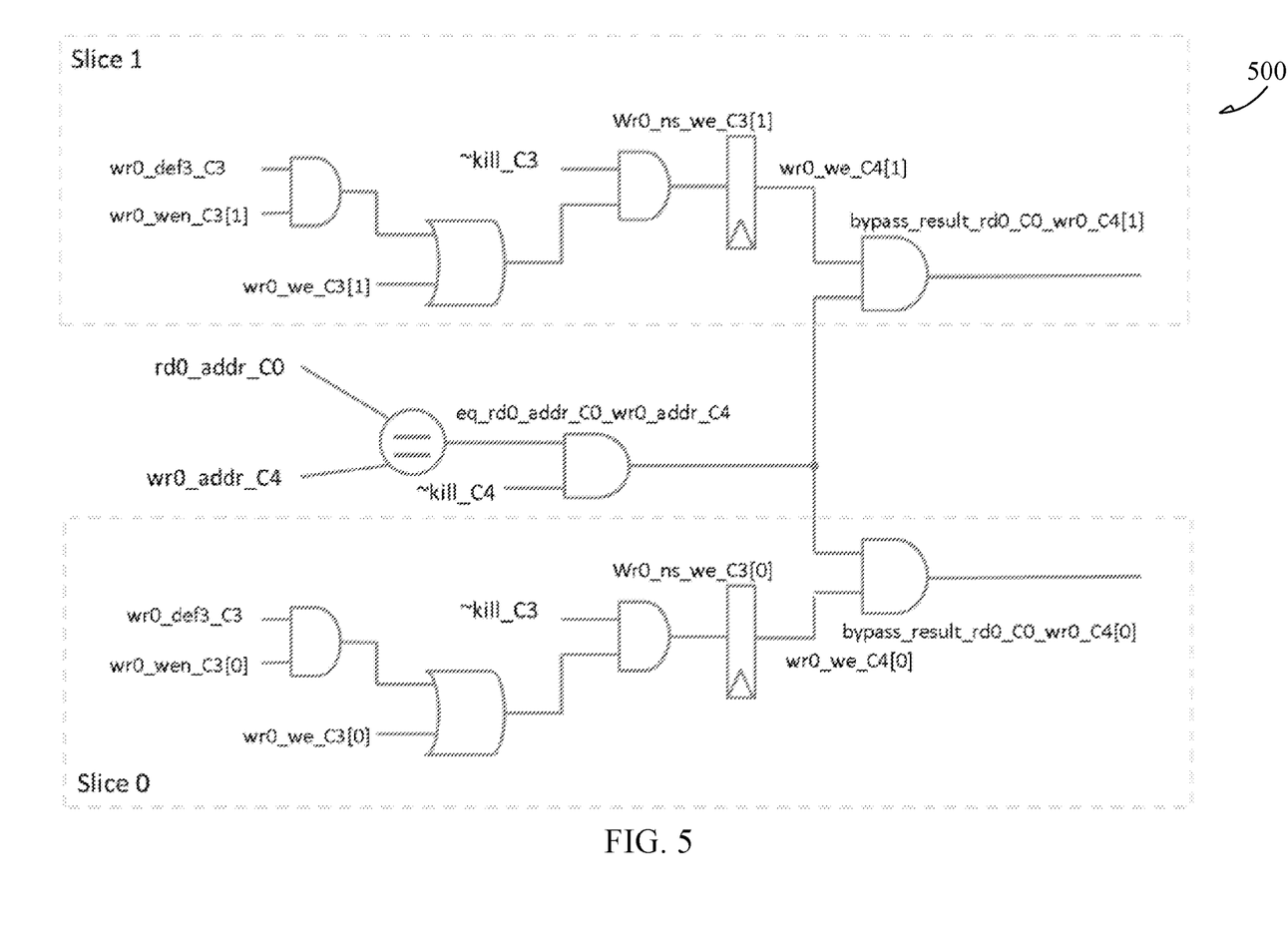
FIG. 5 illustrates generally example logic to control independently generated bypass control signals for each slice of a multi-slice register file.

FIG. 5 illustrates generally example logic 500 configured to control independently generated bypass control signals for each slice of a multi-slice register file, such as that illustrated in the example of FIG. 4. In an example, the example logic in FIG. 5 can be used to control a bypass from the C4 stage of the write port 0 in FIG. 4 to the C0 stage of the read port 0 in FIG. 4. The example logic 500 can be configured to generate a two-bit bypass control signal (bypass_result_rd0_C0_wr0_C4[1], bypass_result_rd0_C0_wr0_C4[0]). The index [0] bit can be used to control the bypass for a first slice, for example, the slice containing the lower bits [7:0], while the index [1] bit can be used to control the bypass for a second slice, for example, the slice containing the upper bits [15:8]. In an example, a two-bit register file enable signal (wr0_wen_C3[1], wr0_wen_C3[0]) for write port zero at stage 3 can be generated from logic similar to that described in the example of FIG. 2. The two-bit signal (wr0_we_C3[1], wr0_we_C3[0]) can be passed from an earlier stage. The logic that compares the address at stage zero of read port zero (rd0_addr_C0) and stage four of write port zero (wr0_Addr_C4) can be shared among all slices. The interlock logic of the register file can remain unchanged.

The individual states can also take advantage of a similar <st>_bitkill signal to partially update writes to a state. Because states can be viewed as a single-entry register file from a hardware perspective, the techniques used on <opnd>_bitkill and the register file, described above, can also be applied to <st>_bitkill and the individual states. Because the individual states have single read and write ports, adding <st>_bitkill to operations writing to a state cannot reduce the number of read ports of the state. However, if the write is at a very late stage, using <st>_bitkill has the advantage of reducing the number of stages in the read pipeline of the state over changing the direction of the state write from out to inout in the operation and MUX the data within the operation. Although not implemented here, this is a straightforward extension of the register file partial update described above.

In addition to allowing register file entries to be updated partially, multiple register file entries can be written in one operation, as operations can specify multiple output arguments. However, arguments need to be encoded separately, to write multiple entries in one operation, more encoding space is required.

Alternatively, the register file can be enhanced to specify groups of entries that can be updated together, such as described in the commonly assigned Wang et al. '881, incorporated by reference in its entirety, above. However, the described implementation in Wang et al. '881 of a register file with multiple groupings can increase the register file area, which can result in slower timing.

Further, the present inventor has recognized, among other things, an enhanced implementation that allow multiple operations at once with little to no area increase and little to no timing degradation.

Multi-slot formats can be used to issue multiple operations in a single cycle. Thus, multiple read and write ports of a register file can be generated to accommodate the multiple read and write requests in one cycle. Due to this reason, it is often the case that the register files already contain multiple read and write ports before the operations accessing groups of the register entries are added. The described implementation reuses existing single-entry register read and write ports on wide register file accesses that access a group of entries. If the addition of the operations that access the group of the register entries do not increase the total number of read and write ports of the register file, the wide register file accesses do not increase the timing and area. If the number of read and write ports are increased moderately, the area increase and timing degradation may still be less than previous implementations.

In TIE language, the register file construct is enhanced to indicate the implementation to be used on the groups of entries access. For example, see Ex. 10, below:

| regfile <name> <width> <depth> <short-name> [<group-name> = <n>]* [port | view] | Ex. 10 |
| --- | --- |

Here, the <name> is a unique identifier to reference the register file (regfile). The <width> and <depth> specify the number of bits in one entry and the number of entries in the register file, respectively. The <short-name> is the name to reference the register file in the assembly language. Multiple groups can be specified on the register file, referred as <group-name>, where the <n> indicates the number of entries to be accessed in a group, which is a power-of-two number. Lastly, the optional keyword view indicates that the register file is implemented using the implementation described in the commonly assigned Wang et al. '881. The keyword port indicates that the register file is implemented using the technique described herein. If the keyword is not specified, the TIE compiler evaluates the hardware cost of both implementations and selects the implantation that achieves the better area and timing.

The register group referred by the identifier <group-name> is implemented using the same hardware as the base register file identified by <name>. Load, store, and move operations and any corresponding protos are needed for the C compiler to automatically allocate the ctypes of the register group. The C compiler is enhanced to allocate a mixture of the register group data and the base register file data in the same hardware implementation. Also, the ctypes of the register group are declared as the struct ctypes of the base register file. Thus, the operations accessing the base register file entries can reference the operations accessing the register group entries in one proto.

For a single-entry register file, the <depth> entries of the register file are specified as <short-name>0, <short-name>1, to <short-name>(<depth>−1) in the assembly language. Suppose value <d> is the smallest power-of-two number that is greater than or equal to <depth>. The single-entry register file of <depth> entries requires log 2(<d>) bits to encode. The entries for the register groups of <n> entries are specified as <short-name>0, <short-name>(<n>), <short-name>(2*<n>) to <short-name>(<depth>−<n>) in the assembly language, assuming <depth> is divisible by <n>. It requires log 2(<d>/<n>) bits to encode.

The operands that access a register file group require fewer bits to encode than the index of the register file entries. For example, an 8-bit, 16-entry register file requires 4 bits to encode to the register file entry index. If an operand accesses two consecutive entries of the register file, the register file becomes a 16-bit, 8-entry register file and three bits are required to encode the register file entry index. If an operand accesses four consecutive entries, two bits are required to encode the register file entry index.

In the proposed implementation described herein, the TIE compiler can map the operand that accesses <n> consecutive entries of the register file to <n> ports of the register file, where <n> is a power-of-two number. Each port requires an extra log 2(<n>) bits than the operand to specify its entry index. Thus, the operand bits encoded in the instruction are used to specify specific bits of the port, for example, the upper bits of the port. In such an example, the port index from 0 to <n>−1 is specified in the least significant log 2(<n>) bits, which is assigned by the TIE compiler. Thus, <n> ports are activated in parallel to access the wide operand of group <n>. For read accesses, after the <n> pieces of data are read out of the register file, the <n> pieces are concatenated to form the wide data, which is then passed to the semantics. In this way the wide operands accessing multiple consecutive entries of the register file can share the ports, its bypass logic and stall logic with the operands that access single entry of the register file.

Take, for instance, the following Ex. 11, below:

```
regfile XR 16 16 xr XR2=2                              Ex. 11
ctype XR 16 16 XR default
ctype XR2 32 32 XR2 {XR a, XR b}
immediate_range immed2 0 60 4
immediate_range immed1 0 60 2
operation ld.XR {out XR a, in XR *b, in immed1 imm}
{out VAddr, in MemDataIn16} {
   assign VAddr = b + imm;
   assign a = MemDataIn16;
}
operation st.XR {in XR a, in XR *b, in immed1 imm}
{out VAddr, out MemDataOut16} {
   assign VAddr = b + imm;
   assign MemDataOut16 = a;
}
operation mv.XR {out XR a, in XR b} { } {
   assign a = b;
}
operation ld.XR2 {out XR2 a, in XR2 *b, in immed2 imm}
{out VAddr, in MemDataIn32} {
   assign VAddr = b + imm;
   assign a = MemDataIn32;
```

-continued

```
}
operation st.XR2 {in XR2 a, in XR2 *b, in immed2 imm}
{out VAddr, out MemDataOut32} {
   assign VAddr = b + imm;
   assign MemDataOut32 = a;
}
operation mv.XR2 {out XR2 a, in XR2 b} { } {
   assign a = b;
}
format F0 64 {F0_S0, F0_S1, F0_S2, F0_S3}
slot_opcodes F0_S0 {mv.XR}
slot_opcodes F0_S1 {mv.XR}
slot_opcodes F0_S2 {mv.XR}
slot_opcodes F0_S3 {mv.XR}
format F1 64 {F1_S0, F1_S1}
slot_opcodes F1_S0 {mv.XR2}
slot_opcodes F1_S1 {mv.XR2}
proto XR2_loadi {out XR2 a, in XR2 *b, in immediate imm} {
} {
   ld.XR2 a, b, imm;
}
proto XR2_storei{inXR2 a, in XR2 *b, in immediate imm} { } {
   st.XR2 a, b, imm;
}
proto XR2_move{out XR2 a, in XR2 b} { } {
   mv.XR2 a, b;
}
```

In this example, register file XR is a 16-bit, 16-entry register file. A register group XR2 is defined on the same implementation that accesses two consecutive entries of the XR register file. Thus, in effect, it is a 32-bit, 8-entry register file.

Load, store, and move operations are specified for both XR and XR2 register files. Format F0 contains four mv.XR operations. Since each mv.XR operation refers one read port and one write port, the XR register file requires at least 4 read ports and 4 write ports to execute four mv.XR operations in the same cycle. Format F1 contains two mv.XR2 operations. Since each mv.XR2 operation refers two read ports and two write ports of the base register file in the described implementation, the total number of read and write ports needed to execute two mv.XR2 operations are also 4, which can be shared with the four read and write ports needed by the mv.XR operations in format F0. Thus, no extra ports are needed to accommodate the operands accessing a pair of register file entries.

Figure 6:
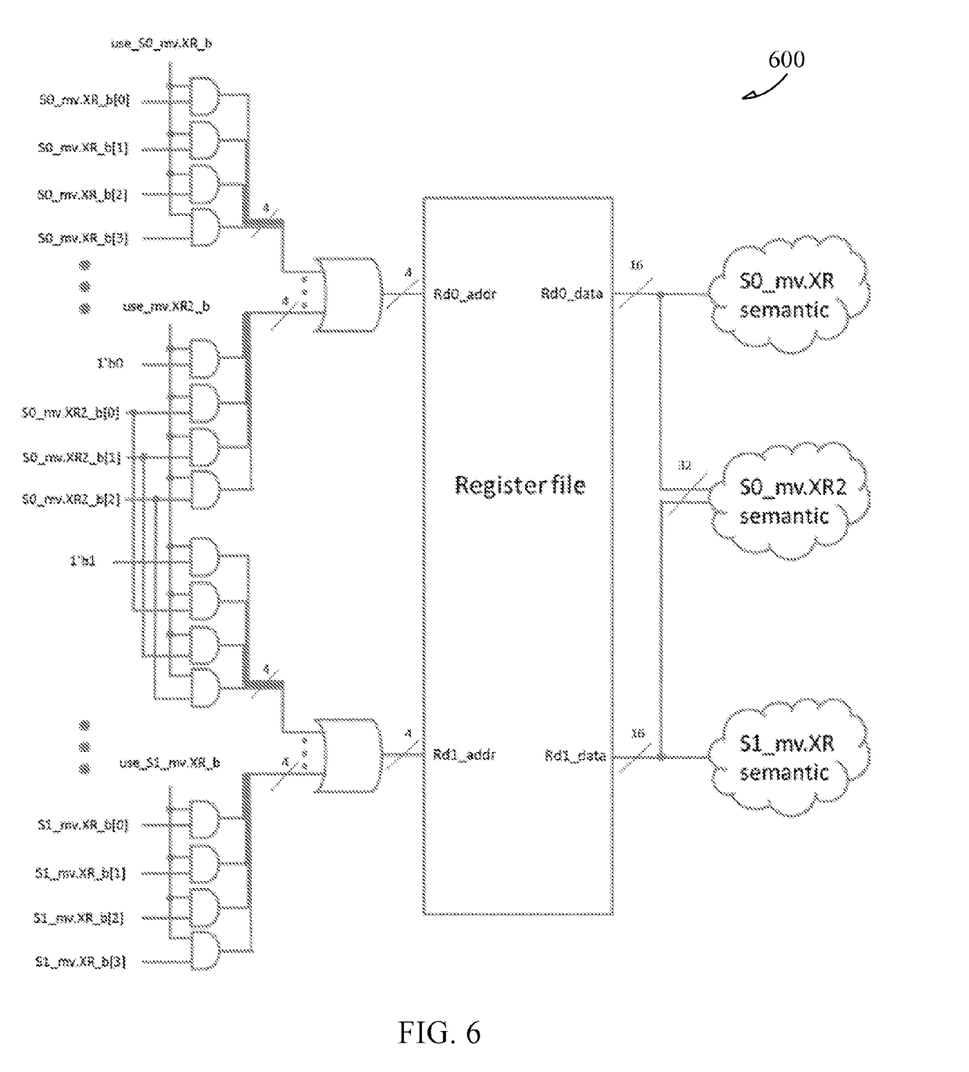
FIG. 6 illustrates generally example TIE compiler generated hardware logic to share the read ports used by specific arguments of an operation.

FIG. 6 illustrates generally example TIE compiler generated hardware logic 600 configured to share the read ports used by the argument b of the operation mv.XR2 in F1_S0 slot and the read ports used by the argument b of the operation mv.XR in F0_S0 and F0_S1 slots. The operation argument b of operation mv.XR in slot index zero is mapped to read port zero of the register file. Its address, which is 4-bits wide, is qualified by the argument select signal, and then ORed with all the other qualified address signals that are mapped to the same read port. The data read from the register file goes into the semantic for mv.XR operation in slot index zero. Similarly, the b of operation mv.XR in slot index one is mapped to read port one. The 4-bit address is also qualified by the argument select signal and then ORed with all the other qualified address signals that are mapped to the same read port. The data read from the register file goes into the semantic for mv.XR operation in slot index one.

The argument b of the operation mv.XR2 refers to two consecutive entries of the XR register file. In the preferred implementation, it is mapped to both read port zero and read port one. Three bits are used to encode the argument b, which forms the upper three bits of the address to be connected to the address of read port zero and read port one. The last bit can be zero for rd0 and one for rd1, and is used to instruct the register file to access the two consecutive entries. The three-bit address from the argument b and the one-bit signal are concatenated to form the four-bit address to the two read ports. After the data values are read out of the register file, the two 16-bit data values are concatenated to form a 32-bit value, which is passed to the mv.XR2 semantic in slot index zero.

An operand can access several consecutive register file entries as well as partially update a register file entry. These two functionalities are orthogonal and can be implemented on the same register file. Implementation can allow operation arguments to update arbitrary numbers of bits of a register file efficiently. The following example illustrates the mixed use of the grouped register file access and the partial update.

In Ex. 8, operations cmv.XR2_lo and cmv.XR2_hi access two consecutive entries of the XR register file, but the operations conditionally update the lower and upper entry of the register file referred by argument a. Operation cmv.XR2_2 conditionally updates the lower entry as well as half of the upper entry of the register file referred by argument a. Operations cmv.XR_lo and cmv.XR_hi access single entry of the XR register file, and conditionally update the lower and upper half of the entry referred by the argument a, respectively.

```
regfile XR 24 16 xr XR2=2 port                              Ex. 12
ctype XR 24 32 XR default
ctype XR2 48 64 XR2 {XR a, XR b}
immediate_range immed 0 60 4
operation ld.XR2 {out XR2 a, in XR2 *b, in immed imm}
{out VAddr, in MemDataIn64} {
    assign VAddr = b + imm;
    assign a = MemDataIn64;
}
operation st.XR2 {in XR2 a, in XR2 *b, in immed imm}
{out VAddr, out MemDataOut64} {
    assign VAddr = b + imm;
    assign MemDataOut64 = a;
}
operation mv.XR2 {outXR2 a, inXR2 b} { } {
    assign a = b;
}
proto XR2_ loadi {out XR2 a, in XR2 *b, in immediate
imm} { } {
    ldXR2 a, b, imm;
}
proto XR2_storei{in XR2 a, in XR2 *b, in immediate imm} { }
{
    st.XR2 a, b, imm;
}
proto XR2_move{out XR2 a, in XR2 b} { } {
    mv.XR2 a, b;
}
operation cmv.XR2_lo {outXR2 a, inXR2 b} { } {
    assign a = b;
    assign a_kill = b[0];
    assign a_bitkill = {24'hFFFFFF, 24'h0};
}
operation cmv.XR2_hi {outXR2 a, inXR2 b} { } {
    assign a = b;
    assign a_kill = b[0];
    assign a_ bitkill = {24'h0, 24'hFFFFFF};
}
operation cmv.XR2_2 {outXR2 a, inXR2 b} { } {
    assign a = b;
    assign a_kill = b[0];
    assign a bitkill ={12'hFFF, 12'h0, 12'h0, 12'h0};
}
operation cmv.XR lo {outXR a, inXR b} { } {
    assign a = b;
    assign a_kill =b[0];
    assign a_ bitkill = {12'hFFF, 12'h0};
}
operation cmv.XR_hi {out XR a, inXR b} { } {
    assign a = b;
    assign a_kill = b[0];
    assign a_bitkill = {12'h0, 12'hFFF};
}
format fmt 64 {slot0, slot1}
slot_opcodes slot0 {cmv.XR_lo}
slot_opcodes slot1 {cmv.XR_hi}
```

Modules, Components, and Logic

Certain embodiments are described herein as including logic or a number of modules, component, engines or mechanisms (collectively referred to as modules). Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Example Machine Architecture and Machine-Readable Medium

Figure 7:
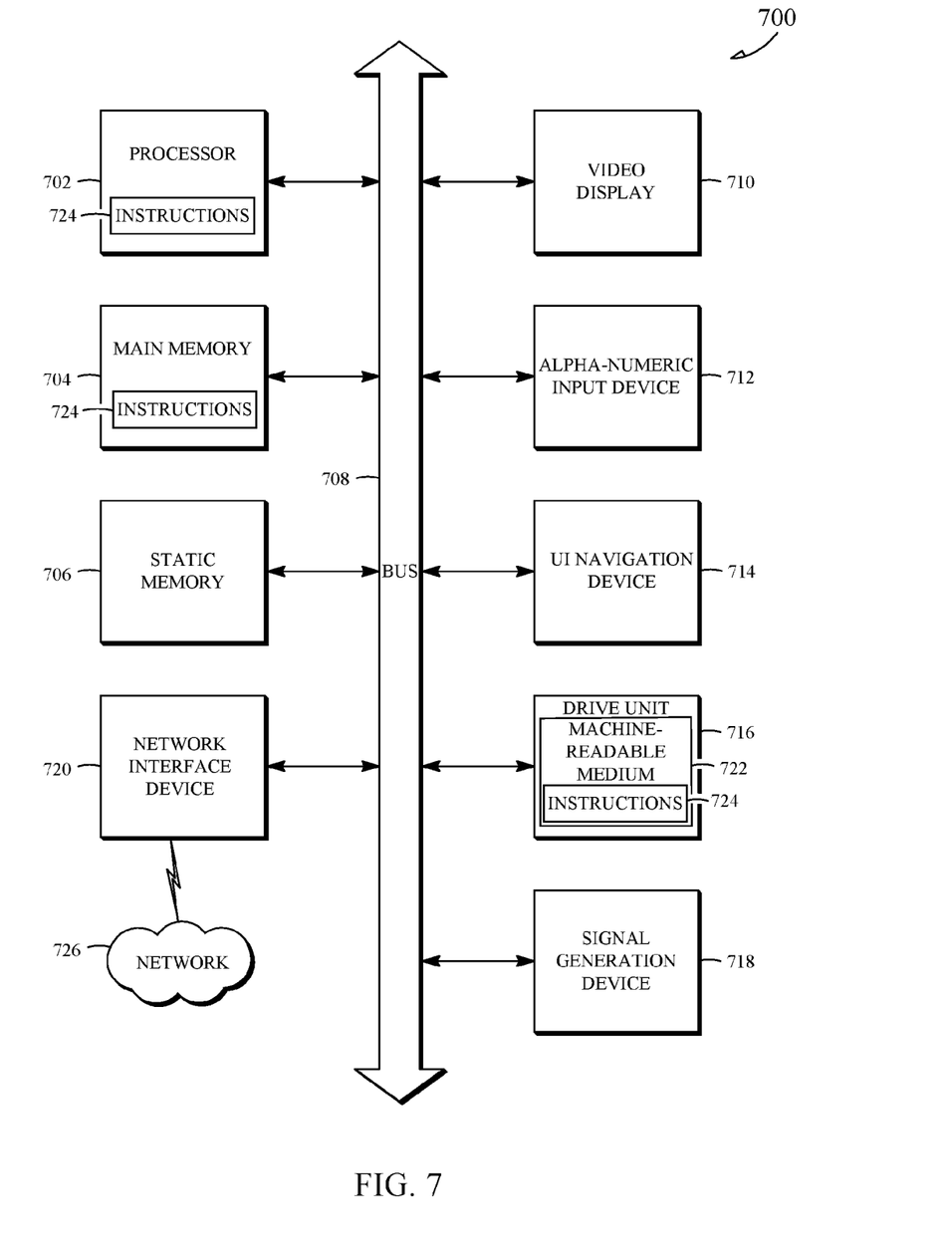
FIG. 7 illustrates generally a diagrammatic representation of a machine in the example form of a computer system within which a set instructions for causing the machine to perform any one or more of the methodologies discussed herein may be executed.

FIG. 7 illustrates generally a block diagram of machine in the example form of a computer system 700 within which instructions 724 for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UI) navigation device 714 (e.g., a mouse), a disk drive unit 716, a signal generation device 718 (e.g., a speaker) and a network interface device 720.

Machine-Readable Medium

The disk drive unit 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704 and/or within the processor 702 during execution thereof by the computer system 700, the main memory 704 and the processor 702 also constituting machine-readable media.

While the machine-readable medium 722 is shown in an example embodiment to be a single medium, the term "machine-readable medium" may include a single medium or multiple media (e.g., a centralized or distributed database, and/or associated caches and servers) that store the one or more instructions 724 or data structures. The term "machine-readable medium" shall also be taken to include any tangible medium that is capable of storing, encoding or carrying instructions for execution by the machine and that cause the machine to perform any one or more of the methodologies of the embodiments of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 724 may further be transmitted or received over a communications network 726 using a transmission medium. The instructions 724 may be transmitted using the network interface device 720 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Additional Notes and Examples

In Example 1, a method includes receiving an instruction to selectively update a value of one or more selected bits of a first register, receiving the one or more selected bits of the first register to be updated and one or more selected bits of the first register to remain unchanged, and selectively updating the value of the one or more selected bits of the first register, using a first write port, without receiving the value of the one or more selected bits of the first register.

In Example 2, the first register of Example 1 optionally includes a first set of bits and the one or more selected bits define a proper subset of the first set of bits.

In Example 3, the instruction to selectively update the value of the one or more selected bits of the first register of any one or more of Examples 1-2 optionally includes a bit level kill signal defining the one or more selected bits of the first register to be updated.

In Example 4, the selectively updating the value of any one or more of Examples 1-3 optionally includes leaving the remaining bits of the first register unchanged.

In Example 5, any one or more of Examples 1-4 optionally includes receiving a value of one or more selected bits of a second register using a first read port and determining an updated value of the one or more selected bits of the first register using the value of the one or more selected bits of the second register.

In Example 6, any one or more of Examples 1-5 optionally include receiving a value of one or more selected bits of a second register using a first read port, wherein the selectively updating the value of the one or more selected bits of the first register includes selectively updating the value of the one or more selected bits of the first register with the value of one or more selected bits of the second register using a set of read/write ports consisting of the first read port and the first write port.

In Example 7, any one or more of Examples 1-6 optionally include receiving a kill signal, wherein the selectively updating the value to the one or more selected bits of the first register includes writing the updated value to the one or more selected bits of the first register when the kill signal includes a first value and not writing the updated value to the one or more selected bits of the first register when the kill signal includes a second value.

In Example 8, the receiving the kill signal of any one or more of Examples 1-7 optionally includes reading the value of a third register using a second read port, wherein the writing the updated value to the one or more selected bits of the first register includes when the value of a specified bit of the third register is zero and the not writing the value to the one or more selected bits of the first register includes when the value of the specified bit of the third register is one.

In Example 9, any one or more of Examples 1-8 optionally includes a register file including a first register, a set of read/write ports configured to selectively update the value of the first register, and a processor configured to receive an instruction to selectively update a value of one or more selected bits of the first register, receive the one or more selected bits of the first register to be updated and one or more selected bits of the first register to remain unchanged, and selectively update the value of the one or more selected bits of the first register using a first write port in response to the received instruction without receiving the value of the one or more selected bits of the first register.

In Example 10, the first register of any one or more of Examples 1-9 optionally includes a first set of bits and the one or more selected bits define a proper subset of the first set of bits.

In Example 11, the instruction to selectively update the value of the one or more selected bits of the first register of any one or more of Examples 1-10 optionally includes a bit level kill signal defining the one or more selected bits of the first register to be updated.

In Example 12, the processor of any one or more of Examples 1-11 is optionally configured to selectively update the value of the one or more selected bits of the first register and leave the remaining bits of the first register unchanged.

In Example 13, the processor of any one or more of Examples 1-12 is optionally configured to receive a value of one or more selected bits of a second register using a first read port and determine the updated value of the one or more selected bits of the first register using the value of the one or more selected bits of the second register.

In Example 14, the set of read/write ports of any one or more of Examples 1-13 optionally consists of the first write port and a first read port, wherein the processor of any one or more of Examples 1-13 is optionally configured to receive a value of one or more selected bits of a second register using the first read port and selectively update the value of the one or more selected bits of the first register with the value of one or more selected bits of the second register using a set of read/write ports.

In Example 15, the processor of any one or more of Examples 1-14 is optionally configured to receive a kill signal, write the updated value to the one or more selected bits of the first register when the kill signal includes a first value, and not write the updated value to the one or more selected bits of the first register when the kill signal includes a second value.

In Example 16, the processor of any one or more of Examples 1-15 is configured to read the value of a third register using a second read port to receive the kill signal, write the updated value to the one or more selected bits of the first register when the value of a specified bit of the third register is zero, and not write the value to the one or more selected bits of the first register includes when the value of the specified bit of the third register is one.

In Example 17, any one or more of Examples 1-16 optionally includes a non-transitory machine readable medium including instructions that, when executed by a machine, cause the machine to perform operations including receiving an instruction to selectively update a value of one or more selected bits of a first register, receiving the one or more selected bits of the first register to be updated and one or more selected bits of the first register to remain unchanged, and selectively updating the value of the one or more selected bits of the first register, using a first write port, without receiving the value of the one or more selected bits of the first register.

In Example 18, the first register of any one or more of Examples 1-17 optionally includes a first set of bits and the one or more selected bits define a proper subset of the first set of bits.

In Example 19, the instruction to selectively update the value of the one or more selected bits of the first register of any one or more of Examples 1-18 optionally includes a bit level kill signal defining the one or more selected bits of the first register to be updated.

In Example 20, any one or more of Examples 1-19 optionally include a non-transitory machine readable medium including instructions that, when executed by a machine, cause the machine to perform operations including receiving a value of one or more selected bits of a second register using a first read port, wherein the selectively updating the value of the one or more selected bits of the first register includes selectively updating the value of the one or more selected bits of the first register with the value of one or more selected bits of the second register using a set of read/write ports consisting of the first read port and the first write port.

In Example 21, any one or more of Examples 1-20 optionally includes accessing n consecutive entries of a register file in a single operation using a register file entry index consisting of B bits and automatically selecting, for a set of register arguments for the n consecutive entries, between a register port for each argument in the set of register arguments requiring a register port or one or more shared register ports for the set of register arguments according to description of an instruction set architecture associated with the register file, wherein B is less than the binary logarithm of a depth of the register file and the depth of the register file corresponds to the number of entries in the register file.

In Example 22, B of any one or more of Examples 1-21 is optionally the binary logarithm of the quotient of the depth of the register file divided by n.

In Example 23, B of any one or more of Examples 1-22 is optionally the binary logarithm of the quotient of d divided by n, wherein d is the smallest power-of-two number that is greater than or equal to the depth of the register file.

In Example 24, the register file entry index of any one or more of Examples 1-23 optionally references the lower entry of the n consecutive entries.

In Example 25, n of any one or more of Examples 1-24 is optionally a power-of-two number.

In Example 26, any one or more of Examples 1-25 optionally includes receiving an instruction to selectively update a value of one or more selected bits of one of the n consecutive entries of the register file, receiving the one or more selected bits of the register file entry to be updated and one or more selected bits of the first register to remain unchanged, and selectively updating the value of the one or more selected bits of the n consecutive entries of the register file, using a first write port, without receiving the value of the one or more selected bits of the first register.

In Example 27, the instruction to selectively update the value of the one or more selected bits of one of the n consecutive entries of the register file of any one or more of Examples 1-26 optionally includes a bit level kill signal defining the one or more selected bits of the first register to be updated.

In Example 28, the automatically selecting between a register port for each argument in the set of register arguments requiring a register port or one or more shared register ports for the set of register arguments of any one or more of Examples 1-27 optionally includes analyzing the total number of register ports required by a processor accessing the register file.

In Example 29, the description of the instruction set architecture associated with the register file of any one or more of Examples 1-28 optionally includes the number of available register ports and the set of arguments associated with the single operation.

In Example 30, any one or more of Examples 1-29 optionally includes a register file having a depth corresponding to the number of entries in the register file and a processor configured to access n consecutive entries of the register file in a single operation using a register file entry index consisting of B bits and automatically select, for a set of register arguments for the n consecutive entries, between a register port for each argument in the set of register arguments or one or more shared register port for the set of register arguments according to description of an instruction set architecture associated with the register file, wherein B is less than the binary logarithm of a depth of the register file.

In Example 31, B of any one or more of Examples 1-30 is optionally the binary logarithm of the quotient of the depth of the register file divided by n.

In Example 32, n of any one or more of Examples 1-31 is optionally a power-of-two number, wherein B is the binary logarithm of the quotient of d divided by n and d is the smallest power-of-two number that is greater than or equal to the depth of the register file.

In Example 33, the register file entry index of any one or more of Examples 1-32 optionally references the lower entry of the n consecutive entries.

In Example 34, any one or more of Examples 1-33 optionally includes a set of register ports configured to selectively update a value of an entry of the register file, wherein the processor is configured to receive an instruction to selectively update a value of one or more selected bits of one of the n consecutive entries of the register file, receive the one or more selected bits of the register file entry to be updated and one or more selected bits of the first register to remain unchanged, and selectively update the value of the one or more selected bits of the n consecutive entries of the register file, using a first write port, without receiving the value of the one or more selected bits of the first register.

In Example 35, the instruction to selectively update the value of the one or more selected bits of one of the n consecutive entries of the register file of any one or more of Examples 1-34 optionally includes a bit level kill signal defining the one or more selected bits of the first register to be updated.

In Example 36, the processor of any one or more of Examples 1-37 is optionally configured to analyze the total number of register ports required for all operations, and to automatically select between a register port for each argument in the set of register arguments requiring a register port or one or more shared register ports for the set of register arguments using the total number of register ports.

In Example 37, any one or more of Examples 1-36 optionally include a non-transitory machine readable medium including instructions that, when executed by a machine, cause the machine to perform operations including accessing n consecutive entries of a register file in a single operation using a register file entry index consisting of B bits and automatically selecting, for a set of register arguments for the n consecutive entries, between a register port for each argument in the set of register arguments requiring a register port or one or more shared register ports for the set of register arguments according to description of an instruction set architecture associated with the register file, wherein B is less than the binary logarithm of a depth of the register file, n is a power-of-two number, and the depth of the register file corresponds to the number of entries in the register file.

In Example 38, B of any one or more of Examples 1-37 is optionally the binary logarithm of the quotient of the depth of the register file divided by n.

In Example 39, B of any one or more of Examples 1-38 is optionally the binary logarithm of the quotient of d divided by n, wherein d is the smallest power-of-two number that is greater than or equal to the depth of the register file.

In Example 40, any one or more of Examples 1-39 optionally include a non-transitory machine readable medium including instructions that, when executed by a machine, cause the machine to perform operations including receiving an instruction to selectively update a value of one or more selected bits of one of the n consecutive entries of the register file, receiving the one or more selected bits of the register file entry to be updated and one or more selected bits of the first register to remain unchanged, and selectively updating the value of the one or more selected bits of the n consecutive entries of the register file, using a first write port, without receiving the value of the one or more selected bits of the first register.

In Example 41, a system or apparatus can include, or can optionally be combined with any portion or combination of any portions of any one or more of Examples 1-40 to include, means for performing any one or more of the functions of Examples 1-40, or a machine-readable medium including instructions that, when performed by a machine, cause the machine to perform any one or more of the functions of Examples 1-40.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method, comprising:
    accessing n consecutive entries of a register file in a single operation using a register file entry index consisting of B bits, wherein n is a power-of-two number; and
    automatically selecting, for a set of register arguments for the n consecutive entries, between a register port for each argument in the set of register arguments requiring a register port or one or more shared register ports for the set of register arguments according to description of an instruction set architecture associated with the register file,
    wherein B is less than the binary logarithm of a depth of the register file, and
    wherein the depth of the register file corresponds to the number of entries in the register file.

2. The method of claim 1, wherein B is the binary logarithm of the quotient of the depth of the register file divided by n.

3. The method of claim 1, wherein B is the binary logarithm of the quotient of d divided by n,
    wherein d is the smallest power-of-two number that is greater than or equal to the depth of the register file.

4. The method of claim 1, wherein the register file entry index references the lower entry of the n consecutive entries.

5. The method of claim 1, including:
    receiving an instruction to selectively update a value of one or more selected bits of one of the n consecutive entries of the register file;
    receiving the one or more selected bits of the register file entry to be updated and one or more selected bits of the first register to remain unchanged; and
    selectively updating the value of the one or more selected bits of the n consecutive entries of the register file, using a first write port, without receiving the value of the one or more selected bits of the first register.

6. The method of claim 5, wherein the instruction to selectively update the value of the one or more selected bits of one of the n consecutive entries of the register file includes a bit level kill signal defining the one or more selected bits of the first register to be updated.

7. The method of claim 1, wherein the automatically selecting between a register port for each argument in the set of register arguments requiring a register port or one or more shared register ports for the set of register arguments includes analyzing the total number of register ports required by a processor accessing the register file.

8. The method of claim 1, wherein the description of the instruction set architecture associated with the register file includes the number of available register ports and the set of arguments associated with the single operation.

9. A system, comprising:
    a register file having a depth corresponding to the number of entries in the register file; and
    a processor configured to:
    access n consecutive entries of the register file in a single operation using a register file entry index consisting of B bits, wherein n is a power-of-two number; and
    automatically select, for a set of register arguments for the n consecutive entries, between a register port for each argument in the set of register arguments or one or more shared register port for the set of register arguments according to description of an instruction set architecture associated with the register file, wherein B is less than the binary logarithm of a depth of the register file.

10. The system of claim 9, wherein B is the binary logarithm of the quotient of the depth of the register file divided by n.

11. The system of claim 9,
wherein B is the binary logarithm of the quotient of d divided by n,
wherein d is the smallest power-of-two number that is greater than or equal to the depth of the register file.

12. The system of claim 9, wherein the register file entry index references the lower entry of the n consecutive entries.

13. The system of claim 9, including a set of register ports configured to selectively update a value of an entry of the register file,
wherein the processor is configured to:
receive an instruction to selectively update a value of one or more selected bits of one of the n consecutive entries of the register file;
receive the one or more selected bits of the register file entry to be updated and one or more selected bits of the first register to remain unchanged; and
selectively update the value of the one or more selected bits of the n consecutive entries of the register file, using a first write port, without receiving the value of the one or more selected bits of the first register.

14. The system of claim 13, wherein the instruction to selectively update the value of the one or more selected bits of one of the n consecutive entries of the register file includes a bit level kill signal defining the one or more selected bits of the first register to be updated.

15. The system of claim 9, wherein the processor is configured to analyze the total number of register ports required for all operations, and to automatically select between a register port for each argument in the set of register arguments requiring a register port or one or more shared register ports for the set of register arguments using the total number of register ports.

16. A non-transitory machine readable medium including instructions that, when executed by a machine, cause the machine to perform operations including:
accessing n consecutive entries of a register file in a single operation using a register file entry index consisting of B bits; and
automatically selecting, for a set of register arguments for the n consecutive entries, between a register port for each argument in the set of register arguments requiring a register port or one or more shared register ports for the set of register arguments according to description of an instruction set architecture associated with the register file,
wherein B is less than the binary logarithm of a depth of the register file,
wherein n is a power-of-two number, and
wherein the depth of the register file corresponds to the number of entries in the register file.

17. The non-transitory machine readable medium of claim 16, wherein B is the binary logarithm of the quotient of the depth of the register file divided by n.

18. The non-transitory machine readable medium of claim 16, wherein B is the binary logarithm of the quotient of d divided by n,
wherein d is the smallest power-of-two number that is greater than or equal to the depth of the register file.

19. The non-transitory machine readable medium of claim 16 including instructions that, when executed by a machine, cause the machine to perform operations including:
receiving an instruction to selectively update a value of one or more selected bits of one of the n consecutive entries of the register file;
receiving the one or more selected bits of the register file entry to be updated and one or more selected bits of the first register to remain unchanged; and
selectively updating the value of the one or more selected bits of the n consecutive entries of the register file, using a first write port, without receiving the value of the one or more selected bits of the first register.

\* \* \* \* \*